United States Patent Office 2,720,785
Patented Oct. 18, 1955

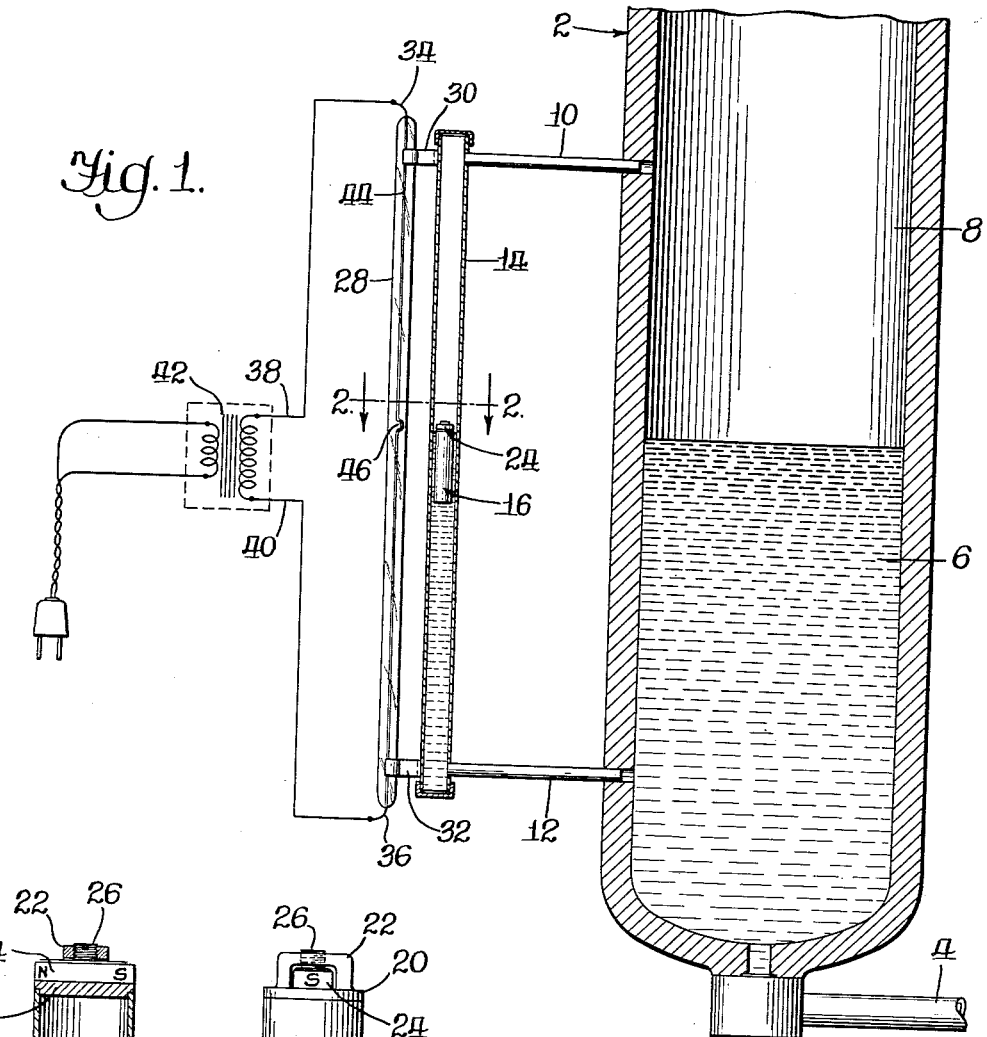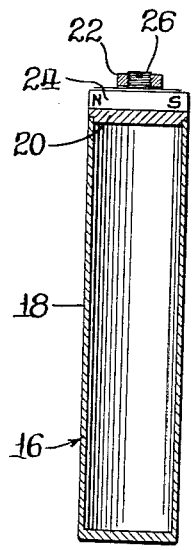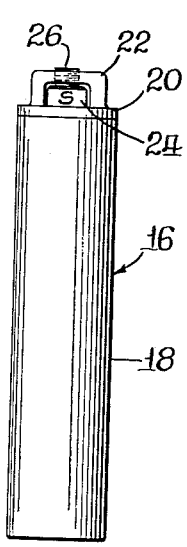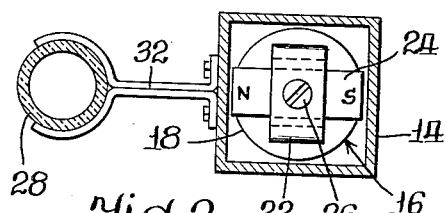

2,720,785
LIQUID LEVEL INDICATOR

Robert K. Sedgwick, Sharonville, Ohio, assignor to American Steel Foundries, Chicago, Ill., a corporation of New Jersey Application December 28, 1951, Serial No. 263,823

7 Claims. (Cl. 73—314)

This invention relates to a level indicator for a liquid retaining vessel wherein the pressure is substantially greater or less than atmospheric as, for example, an air ballasted accumulator vessel such as is commonly utilized in hydraulic supply systems for hydraulic presses, and the like, wherein actuating pressures of the order of one to three thousand pounds per square inch are developed.

Prior art indicators for such vessels have generally been one or the other of two types. The first type comprises a glass tube connected to the vessel so that the level of liquid in the tube is approximately the same as that in the vessel. Such indicators have generally been unsatisfactory due not only to the possibility of breakage, but also to adherence of hydraulic mediums, such as oil, on the inside of the tube, thereby rendering the same substantially opaque.

The second prior art type of level indicator for pressure vessels has utilized a magnetic float supported by the liquid in the pressure vessel or in a communicating vessel, in combination with external mechanical means responsive to the magnetic field of the float. Such mechanical means have been in the form of rollers or arrows within the path of the magnetic field during movement of the float in response to changes of liquid level.

However, such prior art mechanical indicators responsive to magnetic floats have generally been unsatisfactory due to the influence of impacts and vibrations thereon, as well as to mechanical impediments, such as rust and collection of dust.

A primary object of the present invention is to devise electrical means responsive to a magnetic float, such as above described, in order to eliminate the undesirable characteristics of prior art mechanical indicators.

A further object of the invention is to devise electrical means which are visually responsive to changes in the position of the magnetic float thereby eliminating any necessity for calibrating electrical gauges or the like.

A more specific object of the invention is to provide an electrical arc which is disturbed by the magnetic field of the float and is positioned in the path of said field as the float moves upwardly and downwardly in response to variations of the liquid level in the container.

The foregoing and other objects and advantages of the invention will become apparent from a consideration of the following specification and the accompanying drawings, wherein:

Figure 1 is a somewhat diagrammatic view partly in central, vertical section of a liquid level indicator embodying the invention;

Figure 2 is an enlarged sectional view on the line 2—2 of Figure 1;

Figure 3 is a side elevational view partly in central vertical section of the magnetic float utilized in Figures 1 and 2, and Figure 4 is a side elevational view of the float taken from the right, as seen in Figure 3.

Describing the invention in detail, an accumulator vessel or container, generally designated 2, is provided with an outlet line 4, adapted to convey hydraulic fluid such as water or oil to an associated device for using such fluid as, for example, an hydraulic press. The vessel 2 is preferably of the air ballasted type which is conventional in the hydraulic press art and contains a body of hydraulic fluid 6 and a charge of pneumatic pressure fluid 8 under maximum pressure of the order of three thousand pounds per square inch.

The vessel 2 is preferably connected by top and bottom pipes or conduits 10 and 12, to a hollow, substantially vertical column or container 14 so that the level of hydraulic fluid in the column 14 is approximately the same as the level of the hydraulic fluid within the vessel 2. The column 14 may be formed of any desirable non-magnetizable opaque material, such as, for example, stainless steel, aluminum or plastic, depending upon the maximum pressure within the system. The liquid within the column 14 is adapted to support a float, generally designated 16 and comprising a tube 18 sealed by a cap 20 having a U-shaped bracket 22 confining a preferably permanent magnet 24, which is releasably clamped against the cap 20 as, for example, by means of a set screw 26. It may be noted that, if desired, the magnet 24 may be formed as an integral part of the cap 20 or of any other portion of the float 16, the illustrated embodiment being by way of example. Furthermore, the float 16 may be of any desired type, the design of which will necessarily vary depending upon the maximum pressure value within the accumulator vessel 2.

A transparent tube 28 formed of any suitable material such as, for example, glass, is supported by top and bottom spring clamps 30 and 32, which may be conveniently mounted on the side of the column 14 so that one of the north and south poles of the magnet 24 faces the tube 28, said poles being designated N and S, respectively. It may be noted, in this connection, that the column 14, may be of any desired shape and is illustrated as square in Figure 2, in order to limit rotation of the float 16 thereby maintaining one pole of magnet 24 in facing relationship with respect to the tube 28, as shown in Figure 2.

The tube 28 is filled with an inert gas such as argon, carbon dioxide, helium, krypton, neon, nitrogen or xenon under subatmospheric pressure of, for example, 3 centimeters Hg. Electrodes 34 and 36 at opposite ends of the tube 28 are connected to leads 38 and 40 of a conventional transformer 42, whereby the electrodes 34 and 36 conduct electrical current through the inert gas in the tube 28 to form a normally substantially straight arc or light line 44. Thus the tube 28 and its contents constitute what is ordinarily known as a "neon light"; however, that term as used in the specification and the claims hereof is hereby defined as including any light wherein electrical current passes through a gaseous medium to define a light line or arc which is disturbed by a magnetic field.

In this connection it may be noted that such an arc occurs when the inert gas in the tube 28 is at a subatmospheric pressure of about 1 to 3 centimeters Hg, the electrical discharge taking the form of a ribbon of light down the middle of the tube. At pressures higher than that at which such a ribbon appears, the light becomes stringy and flickering and finally disappears as the density of the gas reaches a value at which the current cannot pass between the electrodes. At atmospheric pressure enormous voltages are required to transmit current between electrodes and the resulting discharge resembles a bolt of lightning. At lower pressure than that at which the visible ribbon or arc is visible as, for example, in tubes containing gas under a pressure of a few millimeters Hg, the entire tube is filled with light and an arc is not discernible. For this reason, as above noted, the term "neon light" or "neon tube," as used in the specification and claims hereof, is limited to a light wherein the current and gas pressure are so proportioned as to define a visible light line or arc in the form of a ribbon. Such a ribbon when intersected by a magnetic field develops a clearly visible offset or disturbance, as shown at 46 in Figure 1 of the drawings.

As best seen in Figure 1, the light line 44 is offset as at 46, from its normal straight path between the electrodes 34 and 36, said offset 46 being effected by the magnetic field of the magnet 24 which, as best seen in Figure 1, is in horizontal alignment with the disturbance 46. Thus it will be understood, as the float 16 moves upwardly and downwardly within the column 14 in response to changes of the level of hydraulic fluid 6 within the accumulator vessel 2, the disturbance 46 moves upwardly and downwardly in unison with the magnet 24, thereby affording a positive external, visual indicia of the level of hydraulic fluid 6 within the vessel 2.

It may be noted that although the novel device is particularly useful, as in the illustrated embodiment, for indicating the level of liquid within an opaque container, the device may also be used to indicate the position of any movable member behind an opaque partition such as, for example, the column 14 illustrated in the drawings.

I claim:

1. A liquid level indicator for indicating the variable level of liquid within an opaque non-magnetizable container, said indicator comprising a float supported by said liquid, a magnet movable with the float, and an energized neon tube adjacent said container and passing through the magnetic field of the magnet and extending between vertically spaced levels corresponding to the variable levels of the liquid in said container whereby movement of said magnet between said levels in response to movement of said float is indicated by disturbance of the light line in said tube.

2. A liquid level indicator for indicating the variable level of liquid in an opaque non-magnetizable container, said indicator comprising a float supported by said liquid, a magnet connected to the float for movement in response to movement of said float, and an electric arc externally of the container and extending between vertically spaced points externally thereof, said points approximately corresponding to the variable levels of the liquid in said container, said arc being intersected by the magnetic field of the magnet whereby the latter produces a visible disturbance in the arc at a point correlated to the then level of the liquid.

3. In a liquid level indicator for indicating the level of liquid in an opaque non-magnetizable container; the combination of a float supported by said liquid, a magnet connected to the float for movement therewith in response to change of the liquid level in said container, and an energized neon tube externally of the container intersecting the magnetic field of the magnet to produce a visible electrical disturbance in the tube at a point correlated to the then level of the liquid.

4. A liquid level indicator for indicating the variable level of liquid in an opaque non-magnetizable container, said indicator comprising a visible electric arc arranged to extend between points approximately adjacent the maximum and minimum levels of the liquid in the container, and magnetic float means floatably supported by said liquid for developing a magnetic field intersecting said arc and effecting a visible disturbance therein at a point correlated to the then level of the liquid.

5. An indicator for indicating the position of a movable member at one side of a substantially opaque non-magnetizable partition, said indicator comprising a visible electric arc at the other side of said partition, and magnet means disposed at said one side of said partition and movable lengthwise of said arc in response to change in position of said member, said magnet means developing a magnetic field extending through the partition and intersecting the arc and effecting a visible disturbance in the arc at a point correlated to the then position of the member, whereby a change in position of said member causes a corresponding change in position of said disturbance.

6. An indicator for indicating the position of a member at one side of a substantially opaque non-magnetizable partition, said indicator comprising a neon light at the opposite side of said partition, and magnet means disposed at said one side of said partition and movable in unison with said member lengthwise of said light, said magnet means developing a magnetic field extending through the partition and intersecting said light to create a point of visible disturbance therein correlated to the then position of said member.

7. An indicator for indicating the level of liquid within an opaque non-magnetizable container, said indicator comprising means floating in said liquid, a visible electric arc externally of said container and extending between points located adjacent desired maximum and minimum levels of said liquid, and means supported by said floating means for developing a magnetic field which intersects the arc and creates a visible point of disturbance in said arc correlated to the level of liquid in the container.

References Cited in the file of this patent

UNITED STATES PATENTS

| | | |
|---|---|---|
| 2,182,469 | Davis | Dec. 5, 1939 |
| 2,233,572 | Atkins | Mar. 4, 1941 |
| 2,383,758 | Ziebolz | Aug. 28, 1945 |
| 2,483,266 | De Giers et al. | Sept. 27, 1949 |